United States Patent [19]

Edwards

[11] Patent Number: 4,528,639
[45] Date of Patent: Jul. 9, 1985

[54] METHOD OF AND APPARATUS FOR GENERATING AN INERSTITIAL POINT IN A DATA STREAM HAVING AN EVEN NUMBER OF DATA POINTS

[75] Inventor: Thomas R. Edwards, Huntsville, Ala.

[73] Assignee: The United States of America as represented by the Administrator of the National Aeronautics and Space Administration, Washington, D.C.

[21] Appl. No.: 437,917

[22] Filed: Oct. 29, 1982

[51] Int. Cl.³ .................. G06F 7/38; G06G 7/28; G06G 7/30

[52] U.S. Cl. .................. 364/723; 364/853

[58] Field of Search ......... 364/723, 853, 577, 200 MS FILE, 364/900 MS FILE; 318/573; 340/728

[56] References Cited

U.S. PATENT DOCUMENTS

| | | | |
|---|---|---|---|
| 3,617,716 | 11/1971 | Schulz | 364/723 |
| 3,678,258 | 7/1972 | Patmore | 364/723 |
| 3,862,404 | 1/1975 | Fiedrich | 364/723 |
| 3,943,346 | 3/1976 | Urkowitz et al. | 364/723 |
| 3,996,456 | 12/1976 | Hoover | 364/723 |
| 4,020,332 | 4/1977 | Crochiere et al. | 364/723 |
| 4,150,328 | 4/1979 | Cannon | 364/723 |
| 4,231,097 | 10/1980 | Shibayama et al. | 364/723 |
| 4,316,257 | 2/1982 | Del Medico | 364/577 |

OTHER PUBLICATIONS

Blerkhom et al, "First Order Interpolator—2 Degrees of Freedom Algorithm for Data Compression", *IBM Technical Disclosure Bulletin*, vol 10, #2, Jul. 1967, pp. 133–134.

*Primary Examiner*—James D. Thomas
*Assistant Examiner*—Dale M. Shaw
*Attorney, Agent, or Firm*—Joseph H. Beumer; John R. Manning; Leon D. Wofford, Jr.

[57] ABSTRACT

Apparatus for doubling the data density rate of an analog to digital converter or doubling the data density storage capacity of a memory device. An interstitial data point midway between adjacent data points in a data stream having an even number of equal interval data points is generated by applying a set of predetermined one-dimensional convolute integer coefficients which can include a set of multiplier coefficients and a normalizer coefficient. Interpolator means apply the coefficients to the data points by weighting equally on each side of the center of the even number of equal interval data points to obtain an interstital point value at the center of the data points. A one-dimensional output data set, which is twice as dense as a one-dimensional equal interval input data set, can be generated where the output data set includes interstitial points interdigitated between adjacent data points in the input data set. The method for generating the set of interstital points is a weighted, nearest-neighbor, non-recursive, moving, smoothing averaging technique, equivalent to applying a polynomial regression calculation to the data set.

11 Claims, 6 Drawing Figures

| POSITION | COEFFICIENT |
|---|---|
| R3, L3 | −2 |
| R2, L2 | 3 |
| R1, L1 | 6 |
| NORMALIZER | 14 |

METHOD OF AND APPARATUS FOR GENERATING AN INERSTITIAL POINT IN A DATA STREAM HAVING AN EVEN NUMBER OF DATA POINTS

TECHNICAL FIELD

The invention relates to a method of and apparatus for generating an interstitial point in an input data stream consisting of an even number of data points.

BACKGROUND ART

Digital data storage media, such as tapes or disks, have finite limits, on the density with which data can be stored in order to preserve data integrity. Sometimes, it would be advantageous to be able to effectively double the density of the stored information; and achieving this end is the primary object of the present invention.

DISCLOSURE OF THE INVENTION

According to the present invention, the data density of a storage device can be effectively doubled by a process of operating on the data. Such process doubles the density of a given data set (which is herein defined as a finite number of data points that are presented serially) by sequentially generating interstitial points in a stream of data points as the data is presented. The interstitial points are generated by applying a set of predetermined equal-interval one-dimensional convolute integer coefficients to successive even-numbered, nearest neighbor subsets of the input data stream. This operation generates an output data set which includes interstitial points interdigitated between adjacent data points in the input data set and which, like the input data set, is one-dimensional and has equal intervals between data points.

Figure 1A:
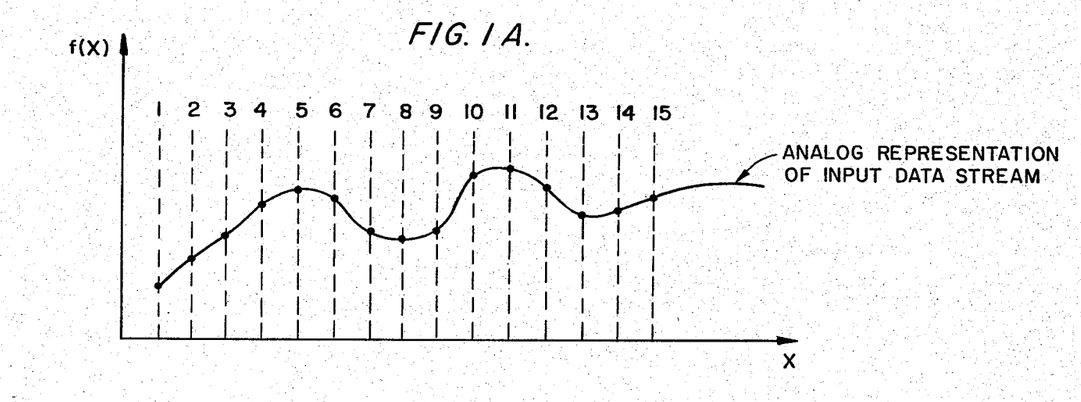
FIG. 1A illustrates a graph of a representative input data set with data points taken at equal intervals at points 1, 2, 3, etc.
Figure 1B:
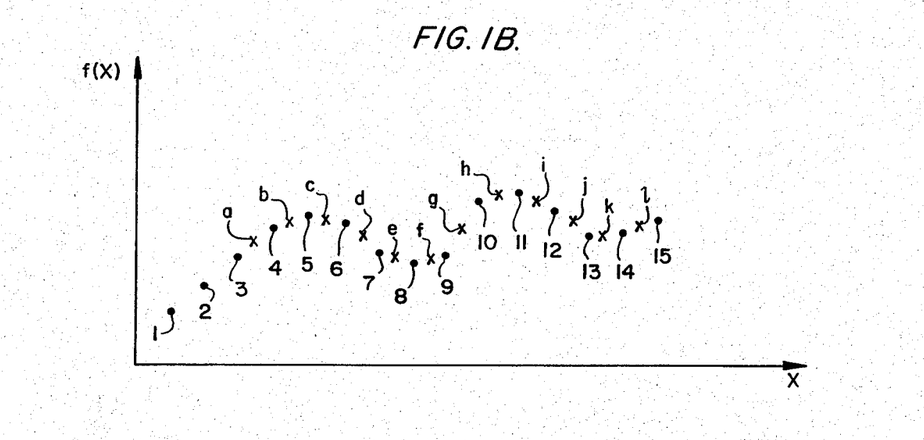
FIG. 1B shows the data points of FIG. 1A with interstitial points a, b, c, etc. which are interdigitated between the data points in the input data set.
Figure 2:
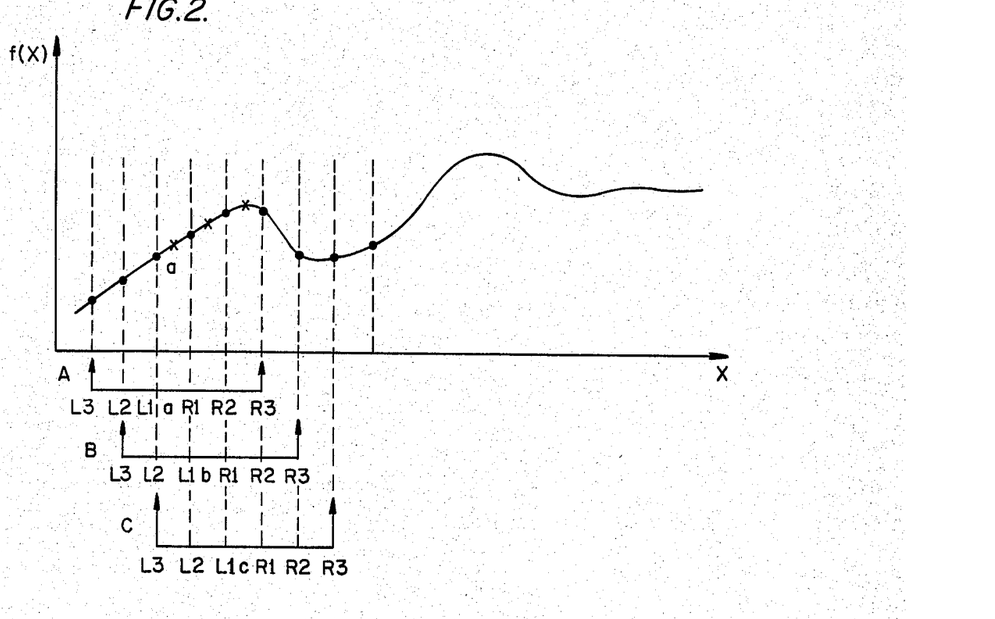
FIG. 2 is a graph of a representative output data set with interstitial points a, b, and c shown between input data set points 3, 4, 5, and 6; data subsets A, B, and C are shown along with the interstitial points a, b, and c to which they correspond.

In other words, an interstitial point is generated in the center of the data points of each even-numbered subset by weighting the data points in the subset in accordance with regression generated normalized one-dimensional convolute integers. The interstitial point intensity results from regression calculations applied to the data set. An arbitrary polynomial of order K is fitted to the data set of N points, where N is even and N is greater than K. The resulting polynomial is then used to calculate the intensity at the center of the data set, i.e., the interstitial point. As shown in FIGS. 1 and 2, the result is an output data stream effectively twice as dense as the input data stream.

By way of more detailed explanation, the interstitial points are obtained by a weighted, nearest-neighbor, non-recursive, moving smoothing averaging technique; this technique uses newly developed one-dimensional convolute integer coefficients for an even numbered data set. The number of elements in the even numbered data set can be any even number which in practice will be much less than the input points in the data set. The invention will hereafter be described for a data set of six.

For a six point data set, there are three multiplier coefficients and a normalizer coefficient. The multiplier coefficients and the normalizer coefficient are applied in a weighted, nearest-neighbor, non-recursive, moving smoothing averaging technique.

The nearest-neighbor aspect means that the technique is applied to six immediately adjacent data points in the set; that is, there are no gaps between the data points in the set.

The moving aspect means that the technique is applied to successive nearest-neighbor subsets of the input data set. Thus, the first six points in the data set are operated on first. Next, the data point on one end is dropped and the next data point at the other end is added to form the next successive nearest-neighbor subset. The new grouping thus contains five data points in common with the previous subset and one new data point. The technique is next performed on the newly formed subset.

The weighted aspect means that the regression-generalized convolute integer coefficients are applied symmetrically with respect to the center of the data subset. That is, the same coefficient will be used to weight data points which are located an equal distance from the center of the subset where the center of the subset is defined as the point which is an equal distance from the two end points in the one-dimensional equal interval data set. Thus, there is no input data set point at the center; instead, the interstitial point to be generated will be located at the center.

Thus, if points at locations to the left of the center are labelled L1, L2, and L3 respectively, and points to the right of center are labelled as R1, R2, and R3 respectively, as shown in FIG. 2, the symmetrical aspect of the weighting requires that the data points at locations R1 and L1 be multiplied by the same coefficient, while points at locations R2 and L2 be multiplied by another coefficient. Similarly, points at locations R3 and L3 will be multiplied by the third coefficient. The technique is completed by adding all of these products together and dividing the sum by a normalizer coefficient. This quotient represents the interstitial point for this particular subset of the input data set. In the output data set, the interstitial point is located between the data points at locations R1 and L1 in the data subset on which the operation is currently being performed.

Of course, the multiplier coefficients could be divided by the normalizer coefficient before using them to weight the data points. This would eliminate the need to add all the products together and divide the sum by the normalizer.

To obtain the next interstitial point, the above technique is applied to the next successive data subset. This interstitial point is located between the data points at locations R1 and L1 in the new grouping comprising the new data subset which is now currently being operated on. It should be noted that this new interstitial point is located between the input data points which were located at positions R1 and R2 in the prior data subset.

It is seen that the output data set, like the input data set, is a one-dimensional, equal-interval data set. However, the output data set is twice as dense as the input data set because it includes interstitial points which are interdigitated with the data points from the input data set.

The apparatus of the present invention provides for generating an interstitial point in a data set having an even number of data points. The apparatus includes storage means for storing a set of convolute integer coefficients; input means for supplying the data set; and interpolator means which receives the set of convolute integer coefficients and the data points and applies the coefficients to the data points by weighting equally on each side of the center of the data points to obtain an interstitial point at the center.

The convolute integer coefficients can include a set of multiplier coefficients and a normalizer coefficient.

The interpolator means can include first adder means which receives the data points and generates a set of first addition signals, where each first addition signal represents the sum of a pair of the data points, each pair being symmetrical with respect to the center of the data points. The interpolator means can further include multiplier means which has a first set of inputs for receiving the set of first addition signals and a second set of inputs for receiving the set of multiplier coefficients and which generates a set of multiplier signals, where each multiplier signal represents the product of one input of the first set of inputs with one input of the second set of inputs in accordance with a predetermined one-dimensional convolute integer weighting technique. The interpolator can further include second adder means which has a set of second adder inputs, each of which receive one signal of the set of multiplier signals, and generates a second addition signal which represents the sum of the signals at the second adder inputs. The interpolator can also include divider means which receives the second addition signal and the normalizer coefficient and generates a division signal representing the quotient produced by dividing the second addition signal by the normalizer coefficient where the amplitude of the division signal represents the value of the interstitial point. The apparatus can further include first shift means which receives the data points in series from the input means and supplies the data points in parallel to the first adder means.

The apparatus of the present invention also provides for generating an output data set from a serial, output interval input data set using a set of predetermined, one-dimensional convolute integer coefficients which include a set of multiplier coefficients and a normalizer coefficient where the output data set includes interstitial points interdigitated between adjacent data points in the input data set. The apparatus includes storage means for storing the convolute integer coefficients and input means for supplying the input data set serially. First shift means receives the input data set from the input means and supplies successive nearest-neighbor subsets of the input data set. Interpolator means receives the set of predetermined convolute integer coefficients and the successive nearest-neighbor subsets and successively applies the coefficients to the subsets by weighting equally on each side of the center of each subset to obtain a set of interstitial points. Sequencer means receives the input data set and the set of interstitial points and interdigitates the input data set with the set of interstitial points to generate an output data set in which an interstitial point is located between each previously adjacent pair of points in the input data set. The apparatus can further include second shift means which receives the input data set from the input data means and supplies the input data set serially to the first sequencer means. The second shift means can be adapted to supply data points in the input data set to the first sequencer means in timed relationship with the receipt of interstitial points by the first sequencer means such that data points arrive sequentially with the interstitial point to which they are to be adjacent in the output data set.

The present invention also provides for a method for generating an interstitial point in a data set having an even number of data points by weighting the data points using a set of predetermined, one-dimensional normalized convolute integer coefficients which include a set of multiplier coefficients and a normalizer coefficient. The method can have the steps of generating a set of first sums by adding pairs of data points which are symmetrical with respect to the center of the data points; generating a set of products by multiplying each sum of the set of first sums by a multiplier coefficient in accordance with a one-dimensional convolute integer weighting technique; generating a second sum by adding the products so generated; and generating a quotient by dividing the second sum by the normalizer coefficient, whereby the quotient so generated represents the interstitial point value for the data points.

The present invention further provides for a method of generating an output data set from a serial, equal interval input data set using a set of predetermined one-dimensional convolute integer coefficients which includes a set of multiplier coefficients and a normalizer coefficient where the output data set includes interstitial points interdigitated between adjacent data points in the input data set. The method includes generating the input data set; providing successive nearest-neighbor subsets of the input data set; successively applying the multiplier coefficients to the data points in the successive subsets by weighting equally on each side of the center of each subset to obtain an interstitial point for each subset; and interdigitating the interstitial points with the data points in the input data set to obtain an output data set in which an interstitial point is located between each previously adjacent pair of points in the input data set.

BRIEF DESCRIPTION OF DRAWINGS

Embodiments of the present invention are shown by specific example in the accompanying drawings, wherein.

BEST MODE FOR CARRYING OUT THE INVENTION

FIG. 1A illustrates a typical input data set having digital values at points 1–15. FIG. 1B illustrates an output data set according to the instant invention. It is seen that interstitial point (a) is located between points 3 and 4 of the input data set. There is no interstitial point between any of the earlier data points because the first nearest-neighbor subset obtains an interstitial point between locations 3 and 4, the next subset obtains one between locations 4 and 5, and so on.

The above descriptions are of course for subsets of six; however, other even-numbered subsets could also be used.

FIG. 2 illustrates a representative output data set with interstitial point (a) shown between input data set points 3 and 4, interstitial point (b) between input data set points 4 and 5, and so on. Data subset A is shown as including points 1, 2, 3, 4, 5 and 6 of the input data set; interstitial point (a) corresponds to data subset A and is thus the interstitial point for points 1, 2, 3, 4, 5 and 6. Similarly, data subset B corresponds to interstitial point (b) and points 2–7 of the input data set.

Figure 3:
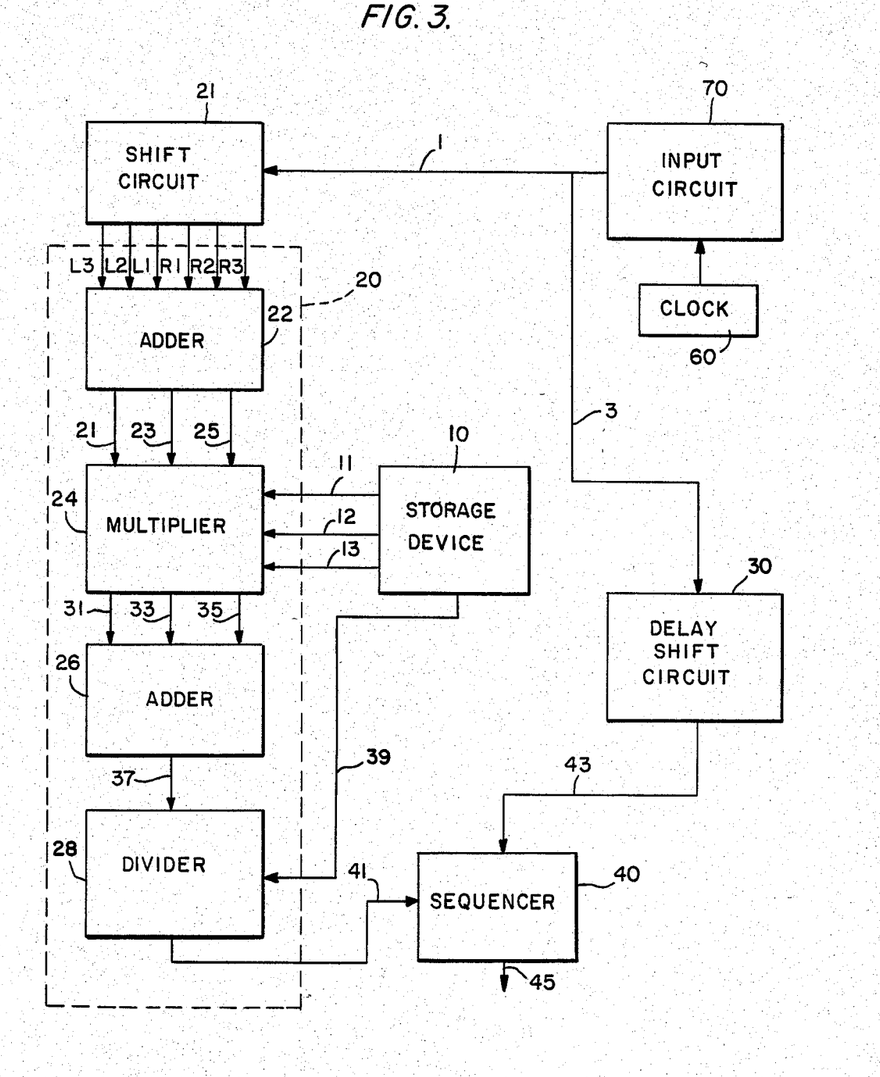
FIG. 3 is a schematic diagram showing the one-dimensional interstitial point generator of the present invention.

Referring now to FIG. 3, an input data set is fed serially from input circuit 70 along line 1 to shift circuit 21 and along line 3 to delay shift circuit 30 to sequencer 40. Storage device 10 supplies predetermined one-dimensional convolute integer coefficients and supplies these coefficients along lines 11, 12, and 13 to interpolator circuit 20. Interpolator circuit 20 generates a signal on line 41 which represents an interstitial point and supplies this signal to sequencer circuit 40. Delay shift circuit 30 receives the input data set serially and supplies this data set serially to sequencer circuit 40. Delay shift register 30 supplies input data set points to sequencer circuit 40 in a timed sequence such that each input data set point arrives at sequencer circuit 40 sequentially with the interstitial point to which it is to be adjacent in the output data set. Sequencer circuit 40 generates an output data set which includes the interstitial points interdigitated with the input data set such that each interstitial point is located between previously adjacent points in the input data set.

The original data can be analog or digital. The analog values are digitized by an analog to digital converter (not shown). The digital data is retained in input circuit 70 and is fed serially into input circuit 21 and delay shift register 30.

The data can come from real-time sensors or digital storage devices, such as discs or tape memory.

Returning now to FIG. 3, shift circuit 21 receives the input data set serially along line 1 from input circuit 70 and supplies adjacent, nearest-neighbor data points in parallel along lines L3, L2, L1, R1, R2, and R3 to interpolator circuit 20. In the figure, shift circuit 21 has six shift positions and can therefore store six data points of the input data set simultaneously. Pulses from clock 60 cause input circuit 70 to feed out the next serial input data set point to shift circuit 21 and delay shift circuit 30. After each clock pulse, a new nearest-neighbor subset of six input set points is present in shift circuit 21. The clock pulses cause successive nearest-neighbor subsets to be stored in shift circuit 21. Further, adder 22 of interpolator circuit 20 as shown in FIG. 3 receives each subset in parallel from shift circuit 21. The clock pulses also cause the input data set points to flow serially through delay shift circuit 30 to be supplied to sequencer circuit 40 at the proper time as previously described.

Interpolator circuit 20 can include adder 22 which receives the nearest-neighbor subsets in parallel along lines L3, L2, L1, R1, R2, and R3. The reference system for the input into adder 22 has been chosen in order to emphasize the symmetry present in each nearest-neighbor subset. The symmetry exists with respect to a center point for the data points fed on lines L3 through R3. This center point is equidistant from the data points on lines L1 and R1, with its distance from these data points being half the interval between data points in the input data set. The interstitial point generated for each subset is located at this center point.

Figure 5:
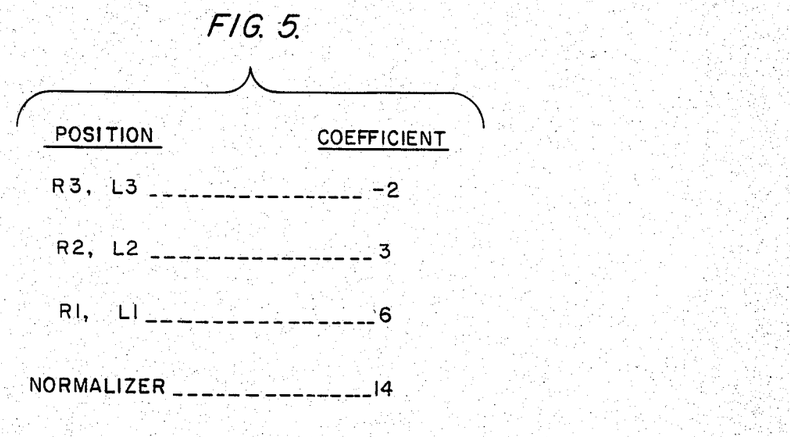
FIG. 5 shows the one-dimensional convolute integer coefficients for an equal-interval, six element data set.

It should be noted that adder 22 shown in FIG. 3 is optional because the data on lines L3, L2, L1, R1, R2, and R3 could be fed directly into multiplier 24 where each data point could then be multiplied by the appropriate convolute integer coefficient as shown in FIG. 5. Thus, in accordance with FIG. 5, the data points at positions R3 and L3 would be each be multiplied by 2, the data point positions R2 and L2 would each be multiplied by 3, and so on. This would result in six lines being fed into adder 26. Otherwise, there would be no difference in the structure or operation of the system by removing adder 22.

Figure 4:
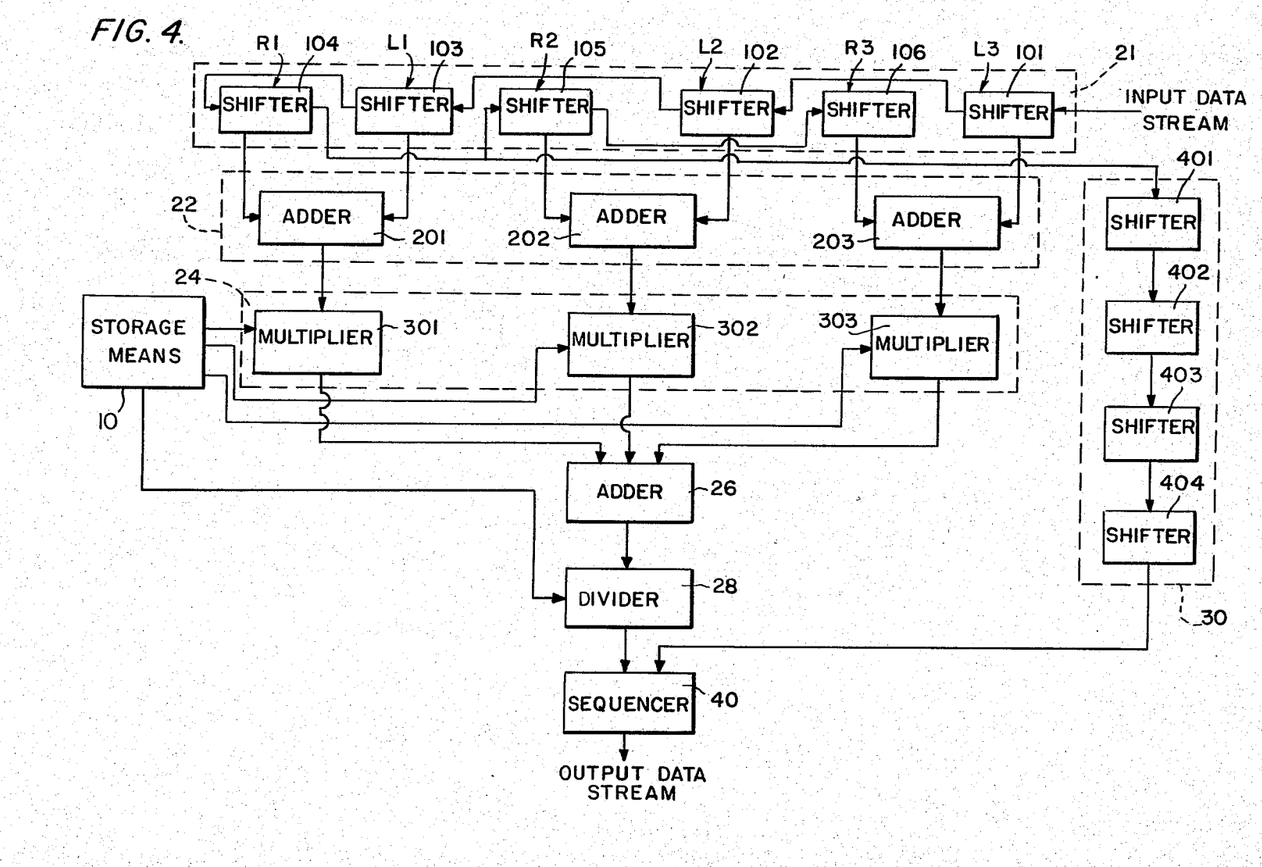
FIG. 4 is a schematic diagram showing the the circuitry of the one-dimensional interstitial point generator of the present invention.

As shown in FIGS. 3 and 4, adder 22 adds the signals or lines R3 and L3, on lines R2 and L2, and on lines R1 and L1 to supply a set of first addition signals along lines 21, 23, and 25 to multiplier 24. Multiplier 24 also receives the convolute integer multiplier coefficients from storage device 10 along lines 11, 12 and 13. Multiplier 24 performs multiplications of each sum with a different convolute integer coefficient to generate a set of multiplication signals along lines 31, 33 and 35. Multiplier 24 performs this multiplication in acccordance with a predetermined one-dimensional convolute integer multiplication scheme. According to this scheme, multiplication is performed as represented by the following formula:

$$Y(i) = \sum_{j=-N/2}^{j=+N/2} IC(j) \times Y(i+j)/\text{Norm}$$

where
$Y(i)$ = the interstitial point value;
$Y(i+j)$ = an input data set point at location $i$;
$IC(j)$ = one-dimensional convolute integer multiplier coefficients for an even numbered data subset at position $j$ in the data set;
Norm = one-dimensional convolute integer normalizer coefficient associated with the set of $IC(j)$'s;

$\frac{-N}{2} \leq j \leq \frac{N}{2}$ = the location in the data subset; and $N$ = the even number of points in the data subset.

Thus, according to this scheme, data points at location L1 and R1 in the data subset will be multiplied by the same multiplier coefficient, likewise, for data points at locations L2 and R2 and at locations L3 and R3. It is clear that this provides weighting about the center of the data subset.

Applying the above equation is equivalent to performing a one-dimensional least squares regression calculation to N data points, the fitting of a generalized polynomial of order q. After all of the regression coefficients of the polynomial are calculated, a new intensity value is obtained at the center of the data subset. This new value is the interstitial value corresponding to the current subset on which the operation is being performed.

Multiplier 24 generates multiplication signals on lines 31, 33 and 35 in accordance with the above described scheme. These signals are supplied to adder 26 which generates a second addition signal on line 37 which corresponds to the sum of signals on lines 31, 33 and 35. Divider 28 receives the convolute integer normalizer coefficient from storage device 10 along line 39 and the output of adder 26 and generates a signal on line 41 which represents the quotient of the output of adder 26 divided by the normalizer coefficient. This also constitutes the interstitial point value and is fed on line 41 to sequencer circuit 40. Delay shift circuit 30 receives the input data set serially along line 3 and delays it such that as the interstitial point value is supplied on line 41, the input data set data point value at point R1 in the current subset substantially simultaneously appears on line 43. Sequencer circuit 40 interdigitates its inputs to generate an output data set in which the interstitial points and the data points from the input data set are arranged alternatively.

FIG. 4 shows shift circuit 21 which comprises six shifters 101–106 arranged in series, each shifter storing successive data points of the input data set. As data enters shift circuit 21, the data is shifted in order through the shifters at positions L3, L2, L1, R1, R2, and R3. Adder circuit 22 includes adders 201–203. The data at positions L3 and R3 are fed into adder 203, positions L2 and R2 into adder 202 and positions L1 and R1 into adder 201. Multiplier circuit 24 includes multipliers 301–303 which receive outputs from adders 201–203 respectively, as well as appropriate convolute integer multiplier coefficients from storage device 10 in accordance with the one-dimensional convolute integer multiplication scheme illustrated in FIG. 5.

FIG. 4 also illustrates delay shift circuit 30. Shift circuit 30 includes shifters 401–404. Shifter 401 receives the output of shifter 104 of shift circuit 21, that is, the successive data points in position R1, as the input data set is shifted through shift circuit 21. This data point is delayed through shift chain 401–404. This provides proper timing with respect to the arrival of the interstitial point and the data point at position R1 in the current data subset at sequencer means 40. Thus, as each interstitial point appears at the input to sequencer circuit 40, the appropriate input data set data point, to which the interstitial point is to be adjacent in the output data set, appears at the same time. It should be noted that sequencer circuit 40 can be a multiplexer.

FIG. 5 illustrates a typical set of convolute integer coefficients for a six point subset. FIG. 5 shows the appropriate coefficient for multiplying each particular data point at specific locations with respect to the center of the subset.

In operation, input circuit 70 supplies a serial input data set to shift circuit 21. Shift circuit 21 has an even number of shift positions, and, once it has been fully loaded, outputs successive nearest-neighbor subsets of the input data set in parallel to adder 22. The number of data points in the subset are equal to the number of shift positions.

Adder 22 adds pairs of data points in each subset which are symmetrical with respect to the center of the subset where the center is defined as the center of the six equal interval data points. Thus, the center is equidistant between the middle two data points and is located a distance between these two data points which is half the distance between adjacent data points and the input data set. Thus, at this center, no data point exists in the input data set. Adder 22 adds the inputs on lines L1 and R1 and supplies a signal representing this sum on lines 21, 23 or 25. Likewise, adder 22 adds inputs on lines L2 and R2, and adds inputs on lines L3 and R3. A signal representing these latter two sums is also supplied on one of lines 21, 23 or 25.

It should be noted that as the input data set is shifted through shift circuit 21, the first input data set point is first located at position L3 and then is shifted successively through positions L2, L1, R1, R2 and R3. Likewise for each succeeding data point. Multiplier 24 receives the output of adder 22 along lines 21, 23 and 25 and the one-dimensional convolute integer for multiplier coefficients from storage device 10 along lines 11, 12 and 13. Multiplier 24 generates an output on lines 31, 33 and 35, each output representing the product of one output adder 22 and a multiplier coefficient. Multiplier 24 produces the outputs in accordance with a one-dimensional convolute integer weighting scheme as depicted in FIG. 5.

Adder 26 receives the outputs of multiplier 24 and generates an output on line 37 which is supplied to divider 28. The output on line 37 represents the sum of the inputs to adder 26. Divider 28 also receives the one-dimensional convolute integer normalizer coefficient from storage device 10 and provides a signal representing the quotient of the two divider inputs to sequencer 40. This quotient represents the interstitial point for the current subset. Sequencer 40 also receives a data point from delay shift circuit 30 which provides the appropriate data point to sequencer 40 which is to be adjacent to the current interstitial point in the output data set. Sequencer 40 provides output along lines 45 in which alternate points are a data point and an interstitial point.

Although the above description assumed a six point data set, the scope of the present invention is not limited to a six point data set, but rather encompasses data sets having any even number of data points. Sets of one-dimensional convolute integers exist for any order of polynomial, K, with the usual restriction that $N > K$, and one-dimensional convolute integers for any even number of points, N, can be generated by a straightforward application of regression calculations as described below.

Using the notation developed by Steiner, J., Termonia, Y, and Deltour, J. in Anal. Chem. 44, 1976, p. 1906, least squares fitting of a polynomial to a data set of N points yields $$Y = D + \epsilon \tag{1}$$

where
D is an Nx1 vector of exact values;
$\epsilon$ is an Nx1 vector of random errors; and
Y is an Nx1 vector of observations.
Now suppose that the polynomial values result from $$D = X\theta \tag{2}$$

where
X is an NxK matrix of known values $N > K$; and
$\theta$ is an Kx1 vector of parameters (the constant coefficients in the polynomial expansion).
Equation (1) can now be written $$Y = X\theta + \epsilon \tag{3}$$

Following the least squares method of estimating the vector of parameters, $\theta$, the scalar sum of squares is minimized $$s = (Y - X\theta)^T \cdot (Y - X\theta)$$

where
s = scalar sum of squares;
T = transpose;

$$\partial s/\partial \theta = 0;$$

and $$\theta = |X^T X|^{-1} X^T Y$$

where $X^T X$ is assumed non-singular.

Now consider an interval on the abscissa from $-m$ to $+m$ and with $2m$ divisions ($2m = N$), the central point of the interval being the interstitial point and having no observational value. Values of $\theta$ will be calculated for this interstitial point, with abscissa value zero. This new ordinate value $Y_o$ will result from $$Y_o = D_o = \theta_1$$

where $\theta_1$ is the first component of the estimated or calculated $\theta$ vector resulting from the regression.

Now the $X(N,K)$ matrix can be written $$Y(N,K) = \begin{vmatrix} 1 & -m & (-m)^2 & & & (-m)^K \\ 1 & - & (-m+1)^3 & & & \\ \cdot & \cdot & \cdot & \cdot & \cdot & \cdot \\ \cdot & \cdot & \cdot & \cdot & \cdot & \cdot \\ 1 & 0 & 0 & 0 & & 0 \\ \cdot & \cdot & \cdot & \cdot & \cdot & \cdot \\ \cdot & \cdot & \cdot & \cdot & \cdot & \cdot \\ 1 & (m-1) & (m-1)^2 & & & (m-1)^K \\ 1 & m & m^2 & m^3 & & m^K \end{vmatrix}$$

where $2m = N$ and $N > K$. Because $\theta$ is now the product of the observation vector Y by a (KxN) matrix, T, where $T = (X^T X)^{-1} X^T$, all $Y_o = D_o = \theta_1$ values can be calculated to obtain the value of the interstitial point, for all N and K, $N > K$.

By this method, sets of one-dimensional convolute integers for even valued data sets having any even number of data points and polynomials of order K, where $N > K$, can be generated for use in connection with an interstitial point generator according to the present invention. These integers can be held in storage means 10, as shown in FIG. 3, allowing for optimal selection of an interstitial value.

From the foregoing description, one skilled in the art can easily ascertain the essential characteristics of this invention and, without departing from the spirit and scope thereof, can make changes and modifications of the invention to adapt it to various usages and conditions.

I claim:

1. Apparatus for generating an interstitial point in a data set having an even number of data points comprising:
    (a) storage means for storing a set of convolute integer coefficients, which set includes a set of multiplier coefficients and a normalizer coefficient;
    (b) input means for supplying said data set;
    (c) interpolator means receiving said set of predetermined convolute integer coefficients and said data points for applying said coefficients to said data points by weighting on each side of the center of said data points to obtain an interstitial point at said center, said interpolator means comprising:
       (d) first adder means having a set of inputs each of which receive one of said data points from said input means, for generating a set of first addition signals in which each signal represents the sum of a pair of said data points which is symmetrical with respect to the center of said data points;
       (e) multiplier means having a first set of inputs for receiving said set of first addition signals and a second set of inputs for receiving said set of multiplier coefficients for generating a set of multiplication signals, each multiplication signal representing the product of one input of said first set of inputs with one input of said second set of inputs in accordance with a predetermined one-dimensional convolute integer weighting scheme;
       (f) second adder means having a set of second adder inputs each of which receives one signal of said set of multiplication signals for generating a second addition signal which represents the sum of addition signals at said set of second adder inputs; and
       (g) divider means receiving said second addition signal and said normalizer coefficient for generating a division signal representing the quotient produced by dividing said second addition signal by said normalizer coefficient, whereby the amplitude of said division signal represents said interstitial point.

2. The apparatus as recited in claim 1 further comprising first shift means receiving said data points in series from said input means for supplying said data points in parallel to said first adder means.

3. An apparatus for generating an output data set from a serial, equal-interval input data set using a set of predetermined one-dimensional convolute integer coefficients which include a set of multiplier coefficients and a normalizer coefficient where said output data set includes interstitial points interdigitated between adjacent data points in the input data set, comprising:
    (a) storage means for storing said convolute coefficients;
    (b) input means for supplying said input data set serially;
    (c) first shift means for receiving said input data set from said input data means for supplying successive nearest-neighbor subsets of said input data set;
    (d) interpolator means receiving said set of predetermined convolute integer coefficients and said successive nearest-neighbor subsets for successively applying said coefficients to said subsets by weighting equally on each side of the center of each subset to obtain a set of interstitial points, said interpolator means comprising:
       (e) first adder means having a set of inputs for sequentially receiving said successive nearest-neighbor subsets from said first shift means for generating a set of first addition signals for each subset where each first addition signal represents the sum of a pair of data points in the subset which is symmetrical in respect to the center of the data points in the subsets;
       (f) multiplier means having a first set of inputs for receiving the set of first addition signals for each subset and a second set of inputs for receiving said set of multiplier coefficients, for generating a set of multiplication signals for each subset where each multiplication signal represents the product of one input of said first set of inputs with one input of said second set of inputs in accordance with a predetermined one-dimensional convolute integer weighting technique;

(g) second adder means having a second set of adder inputs each of which receive one signal of the set of multiplication signals for each subset for generating a second addition signal for each subset which represents the sum of the signals at said set of adder inputs; and (h) divider means receiving said second addition signal for each subset and said normalizer coefficient generating a division signal for each subset where said division signal represents the quotient produced by dividing said second addition signal by said normalizer coefficient, whereby the amplitude of said division signal for each subset represents the interstitial point for that subset; and (i) first sequencer means receiving said input data set and said interstitial points for interdigitating said input data set with said set of interstitial points to generate an output data set in which an interstitial point is located between each previously adjacent pair of points in the input data set.

4. The apparatus as recited in claim 3 further comprising second shift means receiving said input data set from said input data means for supplying said input data set serially to said first sequencer means.

5. The apparatus as recited in claim 3 wherein said interpolator means comprises:

(a) multiplier means having first and second inputs for producing an output which represents the product of the first and second inputs;

(b) second sequencer means receiving said multiplier coefficients and said successive nearest neighbor subsets for selectively providing said multiplier coefficients and the data points in said successive subsets to said first and second inputs of said multiplier means in accordance with a technique for weighting equally on each side of the center of each subset to generate a series of multiplication signals for each subset at the output of said multiplier means;

(c) means for generating an addition signal for each subset representing the sum of said series of multiplication signals; and (d) divider means for generating a division signal for each subset where said division signal represents the quotient produced by dividing said division signal by said normalizer coefficient, whereby the amplitude of said division signal for each subset represents the interstitial point for that subset.

6. The apparatus as recited in claim 3 wherein said first adder means comprises a set of adders each having a pair of inputs for receiving a pair of symmetrical data points in said successive nearest-neighbor subsets from said first shift means and each generating a first shift means and each generating a first addition signal for each subset which represents the sum of the data points at the inputs to the adder.

7. The apparatus as recited in claim 6 wherein said multiplier means comprises a set of multipliers, each having a first input and a second input, each producing an output which represents the product of said first and second inputs, and each receiving at its first input the first addition signal from an adder and at its other input one of said multiplier coefficients.

8. The apparatus as recited in claim 4 wherein said second shift means suplies data points in said data set to said first sequencer means in timed relationship with the receipt of said interstitial points by said first sequencer means such that data points arrive sequentially with the interstitial point to which they are to be adjacent in the output data set.

9. The apparatus as recited in claim 8 wherein the said first shift means comprises a plurality of shifters connected in series.

10. The apparatus as recited in claim 9 wherein said second shift means comprises a plurality of shifters connected in series.

11. A method of generating an output data set from a serial, equal interval input data set using a set of predetermined one-dimensional convolute integer coefficients which includes a set of multiplier coefficients and a normalizer coefficient where said output data set includes interstitial points interdigitated between adjacent data points in the input data set comprising:

(a) generating said serial input data set;

(b) providing successive nearest-neighbor subsets of said input data set;

(c) successively applying said multiplier coefficients to the data points in said successive subsets by weighting equally on each side of the center of each subset to obtain an interstitial point for each subset by the steps of:

(d) generating a set of first sums for each successive subset by adding pairs of data points in each successive subset, said pairs being symmetrical with respect to the center of the data points in each subset;

(e) generating a set of products for each successive subset by multiplying each sum in said set of first sums by a said multiplier coefficient in accordance with a one-dimensional convolute integer weighting technique;

(f) generating a second sum for each successive subset by adding said products; and (g) generating a quotient for each successive subset by dividing said second sum by said normalizer coefficient, whereby said quotient for each successive subset represents the interstitial point for that subset; and (h) interdigitating the interstitial points with the data points in said input data set to obtain an output data set in which an interstitial point is located between each previously adjacent pair of points in the input data set.

* * * * *